(12) United States Patent
Johnson

(10) Patent No.: US 7,124,479 B2
(45) Date of Patent: Oct. 24, 2006

(54) SNAP HOOK

(75) Inventor: Dwight N. Johnson, Carlsbad, CA (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 10/870,257

(22) Filed: Jun. 17, 2004

(65) Prior Publication Data

US 2005/0278908 A1 Dec. 22, 2005

(51) Int. Cl.
*F16B 45/04* (2006.01)

(52) U.S. Cl. .................................... 24/600.7

(58) Field of Classification Search ........... 24/600.4, 24/642, 600.5, 600.7, 600.8, 600.2, 600.1; 294/82.23
See application file for complete search history.

(56) References Cited

U.S. PATENT DOCUMENTS

| | | | | |
|---|---|---|---|---|
| 196,187 | A | * | 10/1877 | Bristol ................. 254/409 |
| 576,339 | A | | 2/1897 | Clayton |
| 697,367 | A | | 4/1902 | Schreffler |
| 709,572 | A | * | 9/1902 | Cowan ................. 294/82.23 |
| 824,179 | A | | 6/1906 | Hayes |
| 1,015,493 | A | * | 1/1912 | Howe ................. 294/82.14 |
| 1,534,879 | A | * | 4/1925 | Stewart ................. 294/82.23 |
| 1,669,418 | A | * | 5/1928 | Lemex ................. 294/82.2 |
| 1,740,782 | A | * | 12/1929 | Ratigan ................. 294/82.23 |
| 3,036,353 | A | * | 5/1962 | Minutoli ................. 24/642 |
| 3,374,512 | A | * | 3/1968 | Metz ................. 24/600.7 |
| 3,728,764 | A | | 4/1973 | Carter |
| 3,859,693 | A | * | 1/1975 | Breed ................. 24/600.7 |
| 5,181,847 | A | | 1/1993 | Da Silva |
| 6,286,190 | B1 | * | 9/2001 | Friend et al. ................. 24/265 H |

FOREIGN PATENT DOCUMENTS

| | | | |
|---|---|---|---|
| DE | 2405097 | B * | 11/1974 |
| DE | 2852333 | A * | 6/1979 |
| WO | WO 200225123 | A1 * | 3/2002 |

OTHER PUBLICATIONS

Universal Mercantile Exchange, Inc.; web page at www.umei.com/; hooks/bolt-snaps-1.htm; date unknown, prior to present invention.

* cited by examiner

*Primary Examiner*—James R. Brittain
(74) *Attorney, Agent, or Firm*—Renner, Kenner, Greive, Bobak, Taylor & Weber

(57) ABSTRACT

A hook and an eye are integral with and located at opposite longitudinal ends of a body. The hook includes a tip spaced from the body and defining a mouth for attachment of the hook to a ring or other object. A lock pin mounted in the body moves axially between a closed position engaging the tip of the hook and an open position. The body has a flat, easily gripped shape with a button at one side movable in a transverse direction. A cam system translates transverse button movement into axial movement of the lock pin, and provides a decreasing force-displacement characteristic. The hook is designed to break to prevent user injury in the event of excessive force, and includes a ramp surface facilitating detachment of the hook.

12 Claims, 3 Drawing Sheets

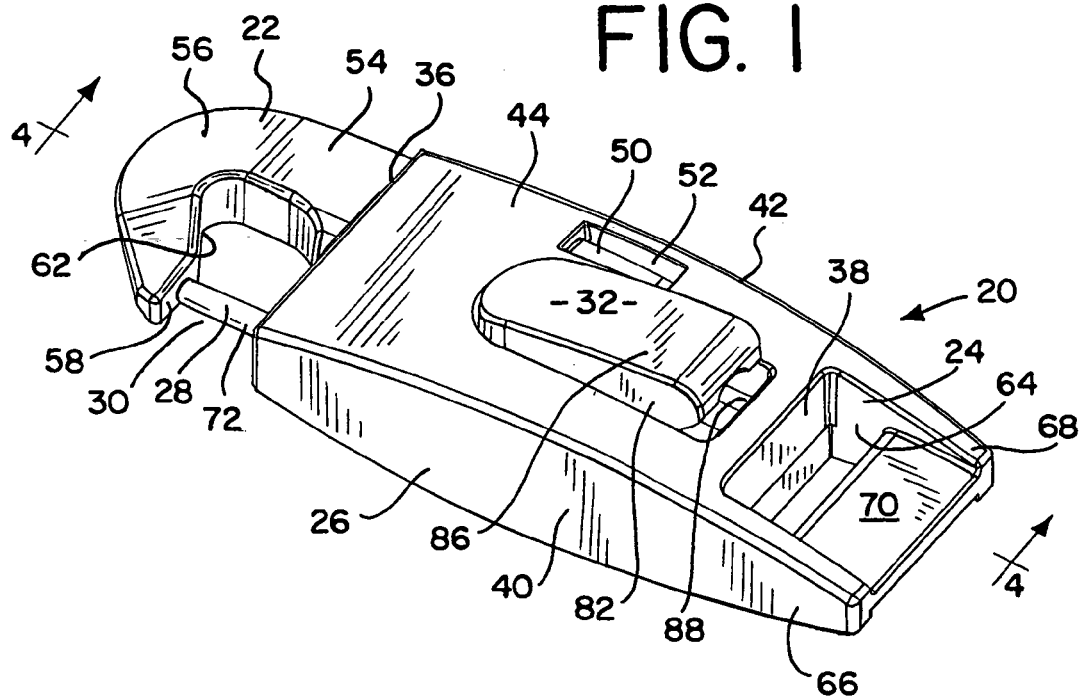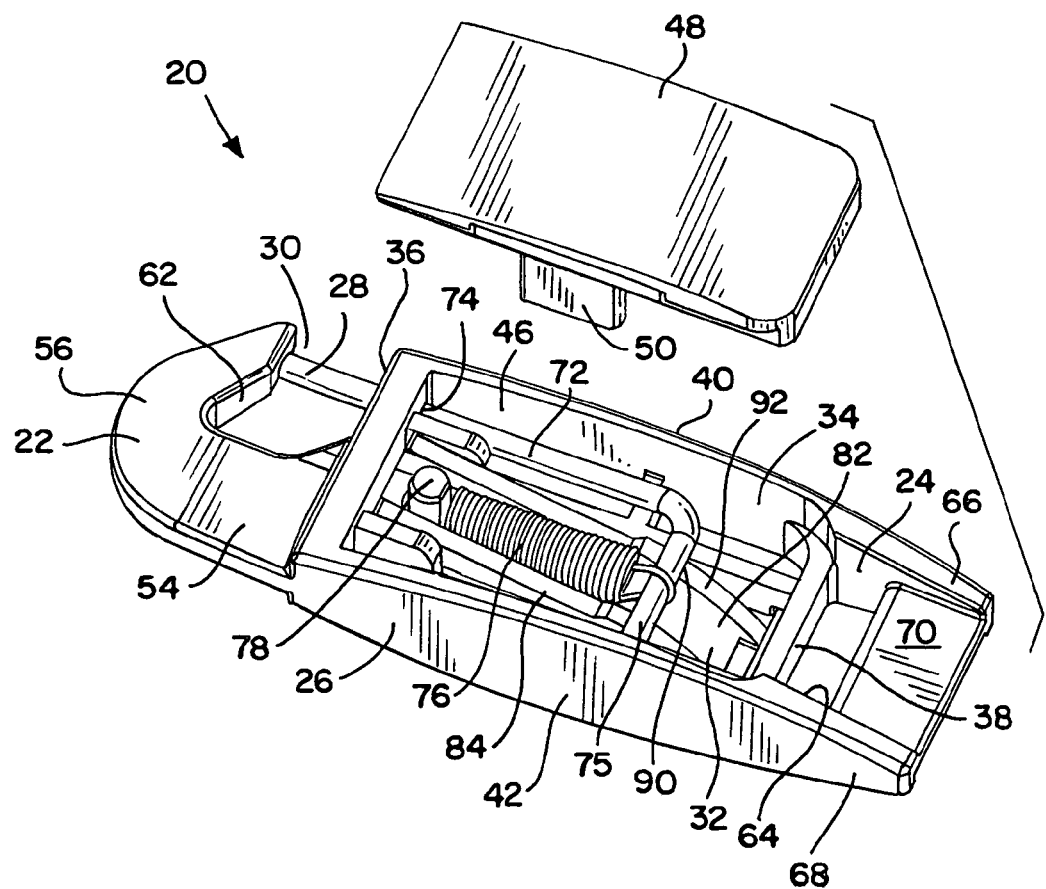

SNAP HOOK

FIELD OF THE INVENTION

The present invention relates to an improved snap hook, or bolt snap.

DESCRIPTION OF THE PRIOR ART

A snap hook, also called a bolt snap, is a fastening and connecting device having numerous uses in applications where it is desired to connect a line, leash, cord, wire or the like to a ring or loop or other object. For example, a snap hook is used to releasably attach a pet leash to a D ring on a collar of a dog. A snap hook has a hook at one end and an eye at the opposite end. A lock pin or other device closes the mouth of the hook to prevent inadvertent release of a ring or other object to which the hook is attached. A mechanism is typically provided for manual release of the lock pin. A widely used type of snap hook includes a spring biased, axially movable lock pin that is manipulated by a small slider button projection near the hook that is moved axially by the user's thumb. U.S. Pat. Nos. 697,367 and 824,179 disclose versions of the conventional snap hook.

The conventional snap hook is subject to disadvantages that can be appreciated by considering the use of a snap hook with a pet leash. One problem is that the lock pin of a typical snap hook is difficult to manipulate. The axially movable slider button projection is small and hard to manipulate. In addition, the eye is typically pivotable or swiveled relative to the hook so that it is hard to hold the snap hook in a desired position. The slender cylindrical shape of the conventional snap hook adds to this difficulty. The axial force required to move the lock pin, resulting from friction and the bias spring force, can be difficult for the user to apply to the small lock pin slider button. In addition, the required manual force increases as the lock pin moves to the open position. After the lock pin is open, it can be hard to attach the hook to a collar ring because the projection and thus the user's hand are close to the hook and block the view of the hook. Removal of the snap hook is also difficult for the same reasons and also because the collar ring can hang up or snag in the hook.

SUMMARY OF THE INVENTION

A primary object of the present invention is to provide an improved snap hook, or bolt snap. Other objects are to provide a snap hook that is easy to attach and remove from an object such as a pet collar ring; to provide a snap hook that is easy to grasp and hold in a desired position; to provide a snap hook that is convenient and easy to open but that resists inadvertent opening; to provide a snap hook that avoids snagging of a ring or other object in the hook; to provide a snap hook which avoids injury to the user; and to provide a snap hook that overcomes disadvantages of known snap hooks and bolt snaps.

In brief, in accordance with the present invention, there is provided a snap hook including a body having a longitudinal axis and first and second axially spaced ends. A hook is provided at the first end of the body. The hook has an axially extending shank, a bail and a tip spaced from the body defining a hook entrance mouth between the tip and the body. A lock pin is mounted in the body for axial movement toward the tip to a closed position and away from the tip to an open position. A button is operably coupled to the lock pin for moving the lock pin toward the open position. The button is mounted on the body for movement in a direction transverse to the axis. A cam system between the button and the lock pin translates transverse button movement into axial lock pin movement.

BRIEF DESCRIPTION OF THE DRAWING

The present invention together with the above and other objects and advantages may best be understood from the following detailed description of the preferred embodiment of the invention illustrated in the drawings, wherein:

FIG. 1 is a top isometric view of a snap hook constructed in accordance with the present invention;

FIG. 2 is a bottom isometric view of the snap hook of the snap hook with the cover removed to reveal the inside of the body of the snap hook;

DETAILED DESCRIPTION OF THE PREFERRED EMBODIMENT

Figure 3:
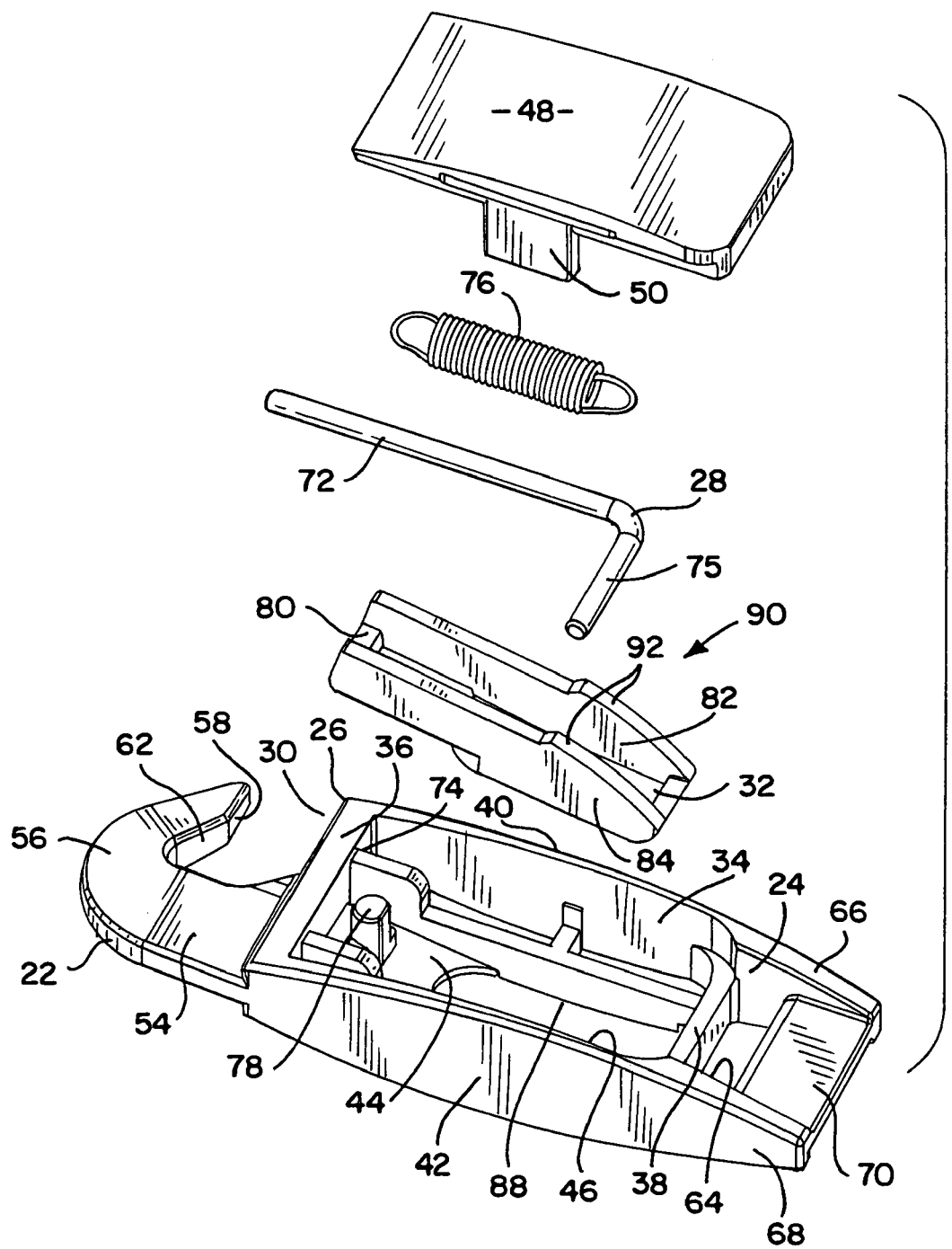
FIG. 3 is an exploded isometric view of the parts of the snap hook.

Having reference now to the drawing, there is illustrated a snap hook, or bolt snap, generally designated as 20 and constructed in accordance with the principles of the present invention. In general the snap hook 20 includes a hook 22 and an eye 24 disposed at opposite ends of a body 26. A lock pin 28 is movable in the direction of the longitudinal axis of the body 26 to open or close a mouth 30 of the hook 22. A button 32 is pressed to retract the lock pin 28 and open the hook 22.

Preferably the body 26 is made of a strong molded plastic material such as glass reinforced nylon. The hook 22 and the eye 24 are integral parts of the body 26, made as a single molded part in a single molding operation, so that the body 20, hook 22 and eye 24 are one homogeneous piece. The eye 24 is integral with and thus nonrotationally fixed to the body 26, making the body 26 easier for a user to hold an manipulate.

The body 26 is hollow and has a central cavity 34 located between end walls 36 and 38 and front and back walls 40 and 42. A closed side wall 44 is at the base of cavity 34. An open side 46 of the body 26 is closed by a cover 48. Cover 48 is held in place by a locking tab 50 received in an opening 52 in the closed side wall 44 of the body 26.

The hook 22 extends from the end wall 36 of the body 26 are includes a shank portion 54 extending in the axial direction. A bail portion 56 extends from the shank portion 54 to a tip portion 58. The tip 58 is spaced from the end wall 36 and defines the mouth 30 through which a collar ring or other object can be received into the hook 22. A ramp surface 62 at the interior of the hook leads to the tip 58 and is disposed at an oblique angle, preferably more than forty-five degrees and less than ninety degrees, relative to the longitudinal axis of the body 26. In the preferred illustrated embodiment, the ramp angle is about sixty-five degrees.

The eye 24 extends in the opposite direction from the hook 22 and includes a slot 64 defined between a pair of arms 66 and 68 extending axially from the end wall 38. A bar 70 extending between the arms 64 and 66 closes the slot 64 and completes the eye 24.

Figure 5:
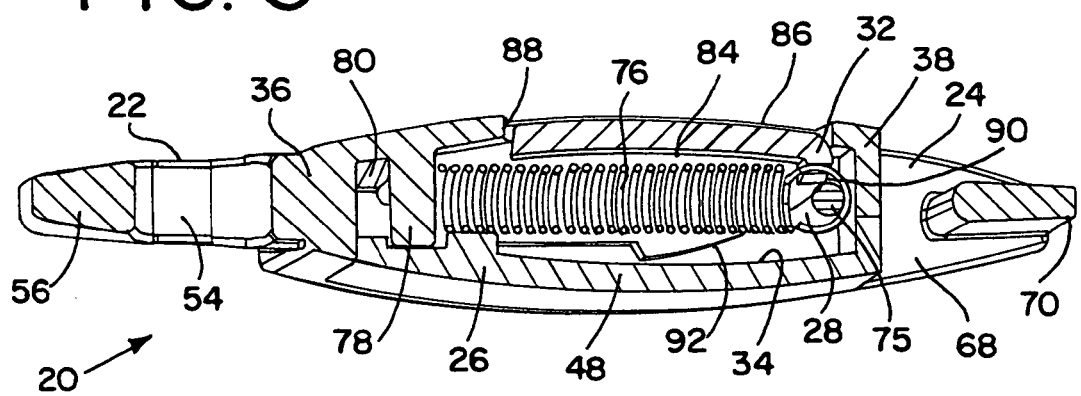
FIG. 5 is a view like FIG. 4 showing the snap hook in the open position.

Lock pin 28 is generally of an L shape (FIGS. 2 and 3) and includes a leg segment 72 extending axially through a guide hole 74 in the end walls 36. In the closed position of the snap hook 20 the end of the leg 72 engages the tip 58 to close the mouth 30. The lock pin 28 moves axially to retract from the tip 58 to an open position (FIG. 5) in which the e mouth 30 is unobstructed. A base segment 75 of the lock pin 28 extends across the cavity 34 in a direction transverse to the longitudinal axis of the body 26. A coil spring 76 is held in tension between the base leg 75 of pin 28 and a post 78 of the body 26 and continuously urges the lock pin 28 toward its closed position.

The lock pin 28 is moved to its open position using the button 32. Button 32 is a lever and has a pivot pin portion 80 extending between a pair of button side walls 82 and 84. The pin 80 is captured for pivotal movement between the post 78 and the end wall 36 of the body 26. At its opposite end the button 32 includes a manually engageable face wall 86 directed outwardly from an aperture 88 in the closed side wall 44.

Figure 4:
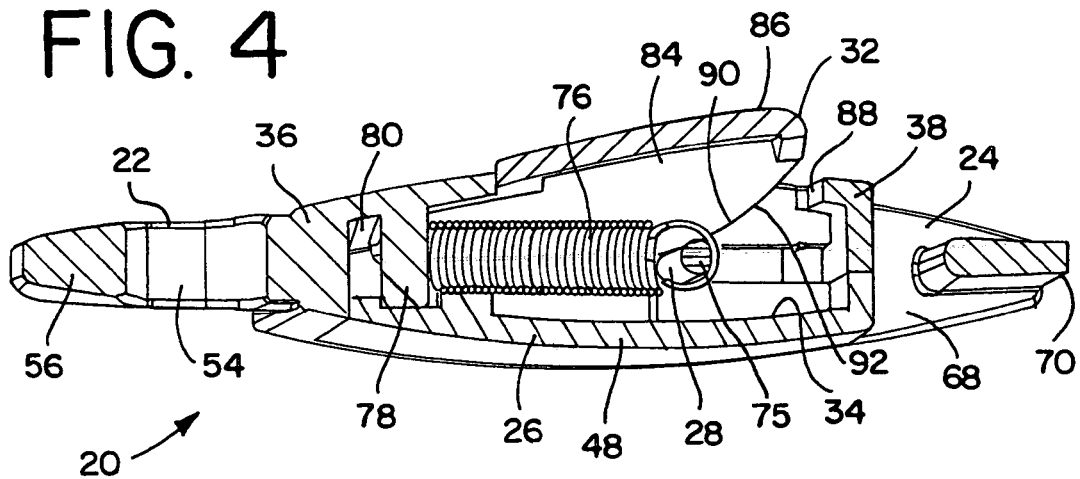
FIG. 4 is a cross sectional isometric side view taken along the line 4—4 of FIG. 1 showing the snap hook in the closed position.

A cam system 90 for moving the lock pin 28 in response to movement of the button 32 includes a curved cam surface 92 formed on the inner edges of the side walls 82 and 84. The force of the spring 76 applied to the cam surface 92 normally holds the button 32 in its outer, open position seen in FIGS. 1 and 4. When the user pushes against the face 86 and pivots the button down into the cavity 34, the cam system 90 moves the lock pin 28 against the force of the spring 76 to the open position seen in FIG. 5. In this motion, the button moves in a direction transverse to the axial direction of lock pin movement.

The preferred illustrated embodiment of the snap hook 20 is intended for use with a pet leash, such as a leash for a small dog. The eye 24 is of a size and shape to accept a standard size three-eighths inch leash such as a woven web or leather strap. Typically eye 24 is attached to the a loop at the end of the leash.

To attach the snap ring 20 with the attached leash to the D ring of a pet collar, the user grasps the snap ring 20 and opens the lock pin 28 using the button 32. The shape of the body 26 and other features of the snap ring facilitate this operation. The body has a generally flat shape that renders the snap hook 20 easy to grasp and to manipulate into a desired position. The length of the body 26 is the distance between the end walls 36 and 38, the width of the body is the distance between the front and back walls 40 and 42, and the thickness of the body 26 is the distance between the closed and open sides 44 and 46. To achieve the flat shape, the length and the width are substantially larger than the thickness. In the illustrated preferred embodiment, the width approaches twice the thickness, and the length is about three times the thickness. The nonrotationally fixed eye 24 also assists in making the snap hook 20 easy to grasp and manipulate.

To open the snap hook 20, the user holds the body 22 and then pushes, typically with the thumb, against the face 86 of the button 32. As a result the button pivots around the pin 80 and moves in a direction transverse to the longitudinal axis of the body 26 into the cavity 34. The location of the button 32 and the cam system 90 permit the hand of the user to be located away from the hook 22. The user manipulates the portion of the button face 86 farthest from the pivot pin 80. This portion is near the end wall 38 and is spaced away from the hook 22. As a result the user, even while holding the snap hook 20 and pressing the button 32, has a clear view of the hook 22, unobstructed by the hand, and can see the hook 22 and the D ring as it is received in the mouth 30 and captured in the hook 22.

The cam system 90 also optimizes the force and button displacement characteristic of the snap hook 20. The user need not directly overcome the axial spring closing force by pushing in the opposite axial direction. Instead the user presses the button 32 in the transverse direction and the cam system 90 translates the transverse motion into axial motion while providing a desired force and motion characteristic seen in FIG. 6.

Figure 6:
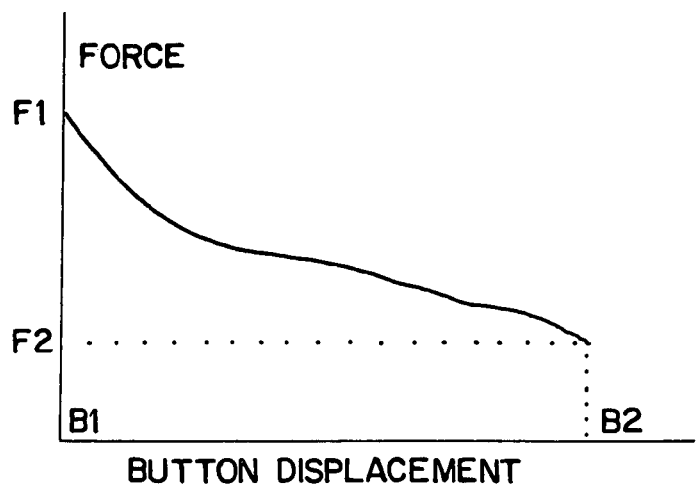
FIG. 6 is a graph showing the snap hook button thumb force on the vertical axis and the button displacement on the horizontal axis.

Unlike conventional snap hooks, the snap hook 20 has a force-displacement characteristic wherein the applied force decreases for at least a large portion of the range of movement of the button 32. As seen in FIG. 6, at the beginning of button displacement B1 (see FIG. 4), the initial force has a maximum value F1. As button displacement continues to maximum displacement B2 (FIG. 5), the force required to move the button decreases to a minimum value F2. The aggregate force includes the friction force and the force of spring 76 acting through the cam system 90. The cam system 90 is configured to provide a desired aggregate force. If desired, the force could increase during a small initial part of button movement to a maximum and then decrease for the remaining, substantial part of the range of button motion, giving an over-center, toggle feel.

In either case, the snap hook 20 provides an improvement over the conventional snap hook where the manual force increases to a maximum value as the lock pin is moved to the fully open position and the spring is compressed to its maximum. In the normal, closed position the initial force holding the lock pin must be large enough to prevent inadvertent opening. Thus a significant initial force (F1 in FIG. 6) is required. In a conventional snap hook, the manual opening force increases substantially and increases over most or all of the lock pin movement, and the snap ring can be difficult to open. The snap hook 20 overcomes this problem because the manual opening force decreases throughout most or all of the button movement and is at a minimum, rather than a maximum, at the end of the button movement.

In the illustrated preferred embodiment of the invention, the total button displacement B2 is about 0.25 inch measured at the end of the button face 86 farthest from the pivot pin 80. The maximum initial force is about 1.15 pound and the minimum final force is about 0.85 pound. Other force-displacement characteristics are possible. To achieve the advantages of this feature of the invention, the button force should decrease during a large part of the range of button motion and should be a minimum as the button reaches the full open position.

The hook 22 is designed to avoid injury to the user. The hook 22 of the snap ring 20 is designed for a predetermined force and is designed to break away if subjected to an excessive force. In the case of a small dog weighing up to 33 pounds, for example, the hook is designed to withstand forces of four times the maximum pet weight, or about 132 pounds. If subjected to forces larger than about 132 pounds that might cause injury to a user holding a leash, the hook 22 fractures and releases the leash from the D ring or other object to which the snap ring 20 is attached. The snap ring and hook can be provided for other pet weights and with other force capabilities.

A conventional snap ring includes a hook having an axial or substantially axial interior surface leading to the tip. There is a tendency for the ring or object attached to the hook to become snagged. As a result, in order to remove the open snap ring from a ring or other object, the hook must move axially toward the ring and then transversely. The ramp surface 62 of the hook 22 avoids this difficulty. When the hook is detached from a ring or the like, the ramp surface guides the ring smoothly to the mouth 30 without snagging.

While the present invention has been described with reference to the to the details of the embodiments of the invention shown in the drawing, these details are not intended to limit the scope of the invention as claimed in the appended claims.

What is claimed is:

1. A snap hook comprising:
   a body having a longitudinal axis and first and second axially spaced ends;
   a hook at said first end of said body, said hook having an axially extending shank, a bail and a tip spaced from said body and defining a hook entrance mouth between said tip and said body; and
   a lock pin mounted in said body for axial movement toward said tip to a closed position and away from said tip to an open position;
   said snap hook being characterized by:
   a button mounted on said body for movement in a direction transverse to said axis; and
   a cam system between said button and said lock pin for translating transverse button movement into axial lock pin movement, said cam system including a curved cam surface providing a decreasing button force requirement throughout at least most of the range of button motion as said lock pin moves toward said open position;
   said lock pin including a segment within said body extending in a direction transverse to said axis, and said cam system including a cam surface on said button engaging said segment.

2. A snap hook as claimed in claim 1 further comprising a spring in said body urging said lock pin toward said closed position.

3. A snap hook as claimed in claim 1 further comprising an eye at said second end of said body.

4. A snap hook as claimed in claim 3, said eye being fixed with respect to said body.

5. A snap hook as claimed in claim 4, said eye comprising a slot extending through said body.

6. A snap hook as claimed in claim 4, said eye and said hook being integral and of one piece with said body.

7. A snap hook as claimed in claim 1, said button including a manually engageable portion located closer to said second end of said body than to said first end of said body.

8. A snap hook as claimed in claim 1, said hook including a ramp portion extending from said bail toward said body and to said tip at an oblique angle relative to said axis.

9. A snap hook as claimed in claim 8, said angle being between forty-five and ninety degrees.

10. A snap hook comprising:
    a body having a longitudinal axis and first and second axially spaced ends;
    a hook at said first end of said body, said hook having an axially extending shank a bail and a tip spaced from said body and defining a hook entrance mouth between said tip and said body;
    a lock pin mounted in said body for axial movement toward said tip to a closed position and away from said tip to an open position; and
    a button operably coupled to said lock pin for moving said lock pin toward said open position;
    said snap hook being characterized by:
    said button being mounted on said body for movement in a direction transverse to said axis; and
    a cam system between said button and said lock pin for translating transverse button movement into axial lock pin movement;
    said button comprising a lever having a first and a second end, said first end being pivotally attached to said body at a location closer to said first end of said body than to said second end of said body.

11. A snap hook as claimed in claim 10, said lock pin including a segment within said body extending in a direction transverse to said axis, and said cam system including a cam surface on said button engaging said segment.

12. A snap hook comprising:
    a body having a longitudinal axis and first and second axially spaced ends;
    a hook at said first end of said body, said hook having an axially extending shank, a bail and a tip spaced from said body and defining a hook entrance mouth between said tip and said body;
    a lock pin mounted in said body for axial movement toward said tip to a closed position and away from said tip to an open position;
    a button operably coupled to said lock pin for moving said lock pin toward said open position; and
    said snap hook being characterized by:
    a spring carried within said body and directly engaging said lock pin to urge said lock pin toward said closed position
    said button being mounted on said body for movement in a direction transverse to said axis; and
    a cam system between said button and said lock pin for translating transverse button movement into axial lock pin movement;
    said button comprising a lever pivotally mounted relative to said body.

* * * * *